United States Patent

Arida et al.

[15] 3,656,807
[45] Apr. 18, 1972

[54] VEHICLE SEAT ASSEMBLY

[72] Inventors: Louis K. Arida, Detroit; Edmond R. Gionet, Warren; Donald E. Gunlock, Birmingham, all of Mich.

[73] Assignee: General Motors Corporation, Detroit, Mich.

[22] Filed: Oct. 16, 1970

[21] Appl. No.: 81,277

[52] U.S. Cl. .......................297/452, 297/454, 297/DIG. 1, 297/DIG. 2, 5/259, 5/353.2
[51] Int. Cl. ...................A47c 7/02, A47c 23/02, A47c 23/00
[58] Field of Search............297/452, 460, 226, 224, DIG. 1, 297/DIG. 2, 218; 5/259–260, 353.2

[56] References Cited

UNITED STATES PATENTS

| | | |
|---|---|---|
| 2,996,733 | 8/1961 | Heffelfinger.....................297/DIG. 1 |
| 3,005,213 | 10/1961 | Brown et al.....................297/DIG. 1 |
| 3,142,515 | 7/1964 | Wall et al........................297/DIG. 1 |

FOREIGN PATENTS OR APPLICATIONS

| | | |
|---|---|---|
| 933,892 | 8/1963 | Great Britain...................297/DIG. 1 |
| 974,039 | 11/1964 | Great Britain...................297/DIG. 2 |

Primary Examiner—Paul R. Gilliam
Attorney—J. L. Carpenter and E. J. Biskup

[57] ABSTRACT

A vehicle seat assembly having a spring support for a seat cushion that includes a plurality of sinuous spring members extending between a border wire and a vertically disposed diaphragm. The sinuous spring members are located in a horizontal plane and encapsulated within a slab of high density plastic foam material, the front end of which is integrally formed with a block of high density foam material. The block serves as a support for maintaining the spring assembly at a predetermined distance above the seat frame.

5 Claims, 4 Drawing Figures

PATENTED APR 18 1972 3,656,807

INVENTORS
Louis K. Arida,
BY Edmond R. Gionet &
Donald E. Gunlock
E. J. Bishup
ATTORNEY

VEHICLE SEAT ASSEMBLY

This invention concerns a seat assembly and more particularly an improved spring support assembly which can be used with seat structures of the type found in automobiles.

More specifically, the seat assembly made according to the present invention is intended to provide improved seating comfort for the seat occupant without requiring a large number of metallic spring members and includes a frame comprising a pair of laterally spaced and substantially parallel side members, each of which has a front end and a rear end. A front rail member connects the front ends of the side members and a rear rail member connects the rear ends so as to form a generally rectangular frame which is structurally rigid and serves as a base for a spring support assembly and the usual seat cushion. The spring support assembly includes a generally U-shaped border wire having the front section thereof located above the front rail member and the side sections thereof extending rearwardly for connection with the lower end of a vertically disposed diaphragm, the upper end of which is connected to the rear rail member. A plurality of sinuous spring members are uniformly spaced along the length of the border wire with each spring member having the front end connected to the front section of the border wire and the rear end connected to the diaphragm. The sinuous spring members are located in a horizontal plane and are encapsulated in a slab of high density foam material, the front end of which is integrally formed with a vertical support that is made of the same material and that extends downwardly in a seating position with the front rail member. The arrangement is such that the usual seat cushion can be placed on the slab of high density foam material with the rear end of the seat cushion located adjacent the diaphragm support.

One feature of this invention is that it provides an improved seat assembly having a unique spring assembly support for the seat cushion. Another feature of this invention is that it provides a spring assembly which combines sinuous springs with a vertically disposed diaphragm that consists of a sheet of elastomeric material that is substantially longer than its width and has a pair of laterally spaced and parallel rods embedded in the diaphragm along its longitudinal edges. A still further feature of this invention is in the encapsulating of a plurality of sinuous spring members within a slab of high density plastic foam material and having one end of the spring members connected to a border wire, while the rear end is connected to a horizontally disposed rod which in turn is connected to a vertically disposed diaphragm. Yet a further feature of this invention is in the use of a unique support clip which permits the diaphragm of a spring assembly to be quickly connected to the frame of the seat assembly.

Other features and advantages of the present invention will be apparent from the following detailed description when taken with the drawing in which.

Figure 1:
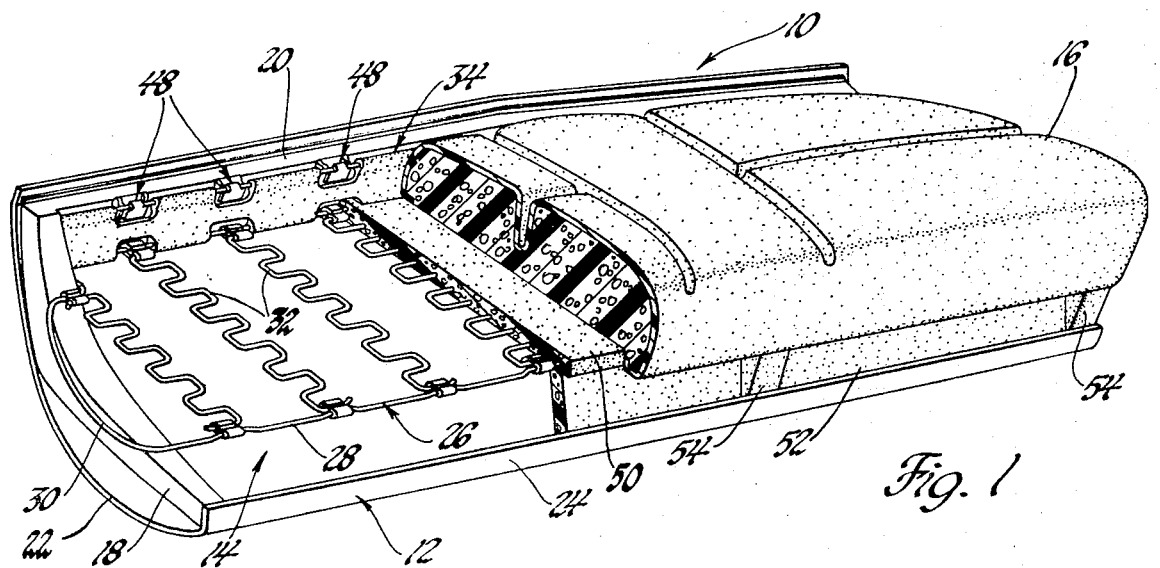
FIG. 1 is an isometric view showing a seat assembly made in accordance with the invention.

Referring to the drawing and particularly FIG. 1 thereof, a seat assembly 10 made in accordance with the invention is shown comprising a seat support frame 12 that incorporates a spring support assembly 14 which in turn serves to support the usual seat cushion 16 of an automobile. More specifically, the support frame 12 includes a pair of generally L-shaped side members, one of which only is shown and indicated by the reference numeral 18, and a rear rail member 20 which interconnects the rear ends of the side members. A panel 22 is rigid with and extends forwardly from the rear rail member 20 and terminates with an upstanding lip or front rail member 24 which interconnects the front ends of the side members.

Figure 2:
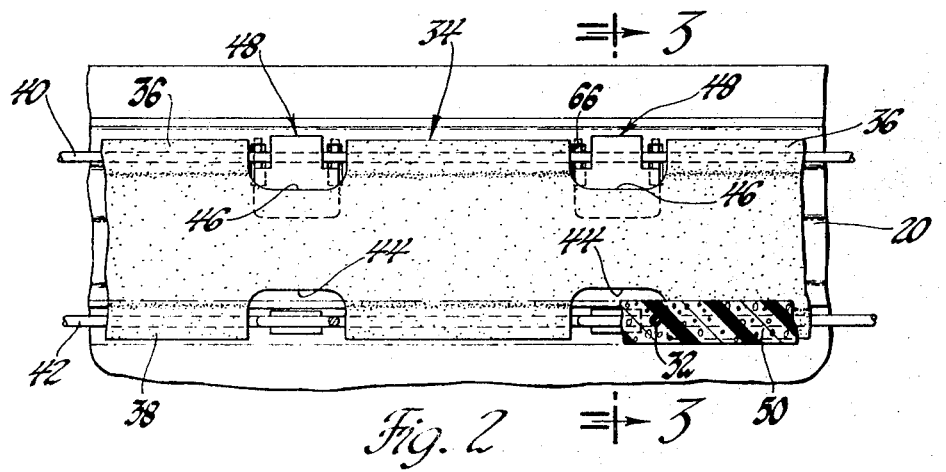
FIG. 2 is an enlarged plan view showing a diaphragm incorporated with the seat assembly of FIG. 1.
Figure 3:
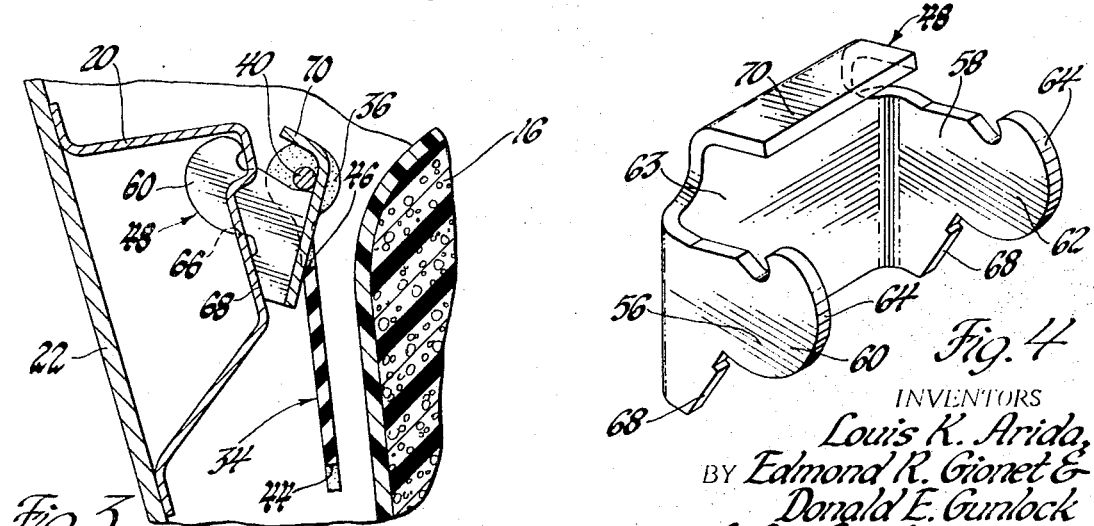
FIG. 3 is an enlarged sectional view taken on line 3—3 of FIG. 2.

Located within and supported by the seat support frame 12 is the spring support assembly 14 which comprises a U-shaped border wire 26 having a longitudinally extending front section 28 integrally formed with rearwardly extending side sections, one of which is shown and identified by the reference numeral 30. A plurality of sinuous spring members 32 have their front ends rigidly clipped to the front section 28 of the border wire 26 and extend rearwardly for connection with a vertically disposed diaphragm 34 located adjacent to the rear rail member 20. As seen in FIGS. 2 and 3, the diaphragm 34 takes the form of an elongated sheet of elastomeric material and has the upper and lower ends thereof respectively formed with bead portions 36 and 38. A pair of elongated support rods 40 and 42 are embedded within the bead portions 36 and 38 respectively, and it will be noted that a plurality of identical cutouts 44 are formed in the lower end of the diaphragm 34 so as to expose the support rod 42 at equally spaced points to permit the rear ends of the sinuous spring members 32 to be connected to the diaphragm 34. Similarly, the upper end of the diaphragm 34 is formed with identical cutouts 46 exposing portions of the support rod 40 that are carried by a plurality of support clips 48 removably secured to the rear rail member 20. Thus, as seen in FIG. 3, the diaphragm 34 is located in a substantially vertical plane and together with the sinuous spring members 32 serves as resilient support for the seat cushion 16.

In order to prevent lateral shifting of the sinuous spring members 32 and to provide increased resiliency to the spring support assembly 14, the entire border wire 26 together with all of the sinuous spring members 32 are encapsulated within a slab 50 of high density urethane foam. In addition, the front end of the slab 50 is integrally formed with a vertically disposed block 52 of high density urethane foam which serves as a stanchion for the front end of the spring support 14. As seen in FIG. 1, the block 52 is of a uniform thickness approximating that of the slab 50 and has a plurality of reinforcing triangular portions 54 integrally formed along the length of the slab 50 for added columnar strength. The lower end of the block 52 is seated within a suitable channel (not shown) formed with the front rail member 24.

Figure 4:
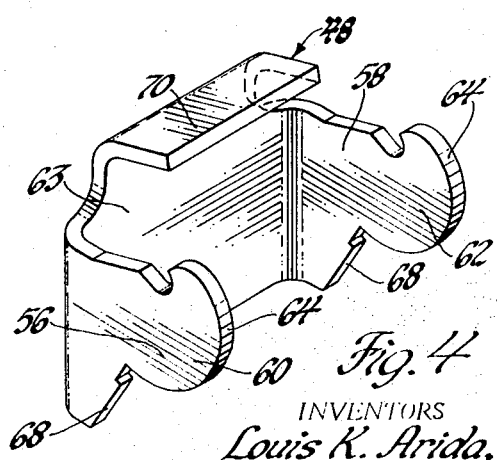
FIG. 4 is an isometric view of a clip formed as part of the seat assembly.

As seen in FIGS. 2, 3 and 4, each support clip 48 comprises a pair of laterally spaced legs 56 and 58 which are formed with hook portions 60 and 62, and are connected to a base section 63. Each hook portion 60 and 62 has a curved outward surface 64 dimensioned so it can be inserted within a vertical extending rectangular slot 66 provided at spaced intervals in the rear rail member 20. Below each hook portion, each leg is formed with an inclined abutment surface 68 which is adapted to engage the rear rail member 20 and coact with the hook portion for securing the support clip 48 thereto. In this regard and as seen in FIG. 3, it will be noted that the slot 66 should have a vertical dimension which will permit the hook portion to pass therethrough with the base section 63 located in a vertical plane. The support clip 48 is then rotated clockwise so as to cause the upper end of the hook portion to engage the inner surface of the rear rail member 20 while the abutment surface 68 engages the outer surface of the rear rail member 20 and thereby permits the support clip 48 to be secured to the rail member. It will be noted also that once the support clip 48 assumes the position of FIG. 3, the rod 40 of diaphragm 34 can be readily slipped over an ear 70 integrally formed with the base section 63 for holding the diaphragm in the assembled position.

From the above, it should be quite apparent that the seat construction made according to the invention requires a minumum of metallic spring members. Moreover, assembly of the various portions of the seat structure into the seat support frame 12 can be accomplished quickly without requiring any special equipment or tooling and with a minimum of manual operations. Moreover, it will be noted that the diaphragm 34 can be formed as a separate member and clipped to the rear ends of the sinuous spring members 32 and the border wire 26. Thereafter, the composite can be placed in a mold for forming the slab 50 which encapsulates the border wire 26 and the sinuous spring members 32. The support block 52 can be formed at the same time so that the entire spring support 14 can be placed as a unit within the seat frame 12 with the support block 52 seated within the front rail member 24 and the rod 40 positioned within the support clips 48 as described above.

Various changes and modifications can be made in this construction without departing from the spirit of the invention. Such changes and modifications are contemplated by the inventors and they do not wish to be limited except by the scope of the appended claims.

We claim:

1. A seat assembly including a seat cushion and a seat support frame, said seat support frame comprising a pair of laterally spaced and substantially parallel side members each of which has a front end and a rear end, a front rail member connecting the front ends of said side members, a rear rail member connecting the rear ends of said side members so as to form a generally rectangular structure with said front rail member, a spring support assembly for said seat cushion, said spring support assembly comprising a generally U-shaped border wire having a front section located above said front rail member and a pair of integral side sections, a slab of high density plastic foam material serving as a base for said seat cushion, a plurality of sinuous spring members connected at one end to said front section and encapsulated together with the border wire in said slab of high density plastic foam material, a diaphragm of elastomeric material connecting the side sections of said border wire and the other ends of said sinuous spring members to the rear rail member, and a block of high density plastic foam material integrally formed with said slab adjacent said front section of the border wire and serving as a support for maintaining the front portion of the spring support assembly above said front rail member at a predetermined distance.

2. The seat assembly of claim 1 wherein said diaphragm is formed with a pair of parallel rods one of which is secured to said other ends of the sinuous spring members and the other of which is fixed to the rear rail member.

3. The seat assembly of claim 2 wherein a plurality of support clips are fastened to the rear rail member and serve to connect the other of said rods to the rear rail member.

4. The seat assembly of claim 3 wherein each of said support clips comprises a base section formed with a pair of laterally spaced and parallel legs, each of said legs having a hook portion and an abutment surface, said rear rail member having vertically orientated slots formed therein for accommodating the hook portions of said support clips whereby each hook portion engages an inner surface of the rear rail member while said abutment surface engages an outer surface of said rear rail member for connecting the support clip to the rear rail member.

5. A seat assembly including a seat cushion and a seat support frame, said support frame comprising a pair of laterally spaced and substantially parallel side members each of which has a front end and a rear end, a front rail member connecting the front ends of said side members, a rear rail member connecting the rear ends of said side members so as to form a generally rectangular structure with said rear rail member located at an elevation higher than the front rail member, a spring support assembly for said seat cushion, said spring support assembly comprising a generally U-shaped border wire having a front section located above said front rail member and a pair of rearward extending side sections located adjacent to and above said side members, a slab of high density plastic foam material serving as a base for said seat cushion, a plurality of sinuous spring members located in a substantially horizontal plane and connected at one end to said front section and encapsulated together with the border wire in said slab of plastic foam material, an elongated diaphragm of elastomeric material located in a substantially vertical plane for connecting the side sections of said border wire and the other ends of said sinuous spring members to the rear rail member, and a block of plastic foam material integrally formed with said slab adjacent said front section of the border wire and serving as a support for maintaining the front portion of the spring support assembly above said front rail member at a predetermined distance.

* * * * *